US 12,390,889 B2

(12) United States Patent
Barlow et al.

(10) Patent No.: US 12,390,889 B2
(45) Date of Patent: Aug. 19, 2025

(54) BEAM ROTATION DEVICE AND SYSTEM

(71) Applicant: Innovatech Systems, LLC, Kanarraville, UT (US)

(72) Inventors: James Barlow, Colorado City, AZ (US); James Harker, Colorado City, AZ (US)

(73) Assignee: Innovatech Systems, LLC, Kanarraville, UT (US)

( * ) Notice: Subject to any disclaimer, the term of this patent is extended or adjusted under 35 U.S.C. 154(b) by 948 days.

(21) Appl. No.: 17/526,860

(22) Filed: Nov. 15, 2021

(65) Prior Publication Data
US 2022/0395932 A1  Dec. 15, 2022

Related U.S. Application Data

(60) Provisional application No. 63/208,628, filed on Jun. 9, 2021.

(51) Int. Cl.
*B23K 31/02* (2006.01)
*B23K 37/04* (2006.01)

(52) U.S. Cl.
CPC .......... *B23K 31/02* (2013.01); *B23K 37/0435* (2013.01); *B23K 37/0452* (2013.01)

(58) Field of Classification Search
CPC .. B23K 31/02; B23K 31/022; B23K 37/0435; B23K 37/0452; B23K 37/0443; B23K 2101/28; B66C 1/10; B66C 1/125; B66C 13/08
See application file for complete search history.

(56) References Cited

U.S. PATENT DOCUMENTS

| | | | |
|---|---|---|---|
| 3,677,418 A | 7/1972 | Fanzen | |
| 3,868,024 A | 2/1975 | Lee | |
| 4,308,699 A | 1/1982 | Slysh | |
| 5,255,489 A | 10/1993 | Matsumoto et al. | |
| (Continued) | | | |

FOREIGN PATENT DOCUMENTS

| | | |
|---|---|---|
| CN | 103659132 B | 11/2015 |
| JP | S61078576 A | 4/1986 |
| JP | H11285895 A | 10/1999 |

OTHER PUBLICATIONS

Peddinghaus, Turning Device for Welding, Aug. 30, 2018, URL:https://www.peddinghaus.com/pdf/machines/peddirotator_inch.pdf (retrieved Oct. 14, 2024).

*Primary Examiner* — Stephen A Vu
(74) *Attorney, Agent, or Firm* — Gurr & Brande, PLLC; Robert A. Gurr

(57) ABSTRACT

The beam rotation device described herein has a base support with a first vertical jaw arm, a second vertical jaw arm, and a support arm. The second vertical jaw arm may be pivotally coupled to the device so as to go from a first, closed position to a second, opened position to receive a steel beam (e.g., I-beam). Once the steel beam is placed within the device, the support arm may hold the beam stationary to allow a worker to weld or perform other tasks. It will be appreciated that multiple beam rotation devices may be coupled together and work in tandem to receive and rotate a beam. The beam rotation device creates a safer working environment than the rotators found in the art by having a pivotable second vertical jaw arm that may open to receive a beam and a support arm to hold the beam during fabrication.

19 Claims, 12 Drawing Sheets

(56) References Cited

U.S. PATENT DOCUMENTS

| | | | |
|---|---|---|---|
| 5,363,527 A | 11/1994 | Rainaud et al. | |
| 6,892,520 B2 * | 5/2005 | Rowse | A01D 78/146 56/375 |
| 2005/0039432 A1 * | 2/2005 | Rowse | A01D 78/146 56/379 |
| 2005/0144925 A1 | 7/2005 | Rowse et al. | |
| 2011/0108654 A1 * | 5/2011 | Babb | G03B 37/005 242/405 |
| 2015/0246681 A1 * | 9/2015 | Raper, Jr. | B66F 5/02 254/4 R |

\* cited by examiner

BEAM ROTATION DEVICE AND SYSTEM

CROSS-REFERENCE TO RELATED APPLICATIONS

This application claims the benefit of U.S. Provisional Application Ser. No. 63/208,628, filed Jun. 9, 2021, which is incorporated herein by reference.

TECHNICAL FIELD

The present disclosure relates to an apparatus to assist a user in fabricating steel beams. More particularly, the present disclosure relates to a beam rotation device and system that rotates steel beams so as to assist in fabrication.

BACKGROUND

Steel beams, such as I-beams, were introduced into the construction industry in the late 1800s. It was not long after that people realized the strength and durability of steel beams. These steel beams would end up revolutionizing the construction industry. Even though steel beams are prevalent throughout the construction industry, they are difficult to manufacture and transport. For example, fabricating and moving steel beams is difficult due to their size and weight. In addition, the size and weight of the steel beam also introduces many hazardous working conditions that can lead to injury.

To address the obstacles of working with steel beams, individuals have created structural beam rotators that help remove hazardous working conditions and assist workers in fabricating the beams. However, these structural beam rotators are not without their flaws. Many of the rotators include arms with a narrow opening to receive the steel beams. Often, these openings are too narrow and do not open or extend outward, thereby creating additional hazards while trying to insert a beam into the structural beam rotator. In addition, many of the structural beam rotators have a chain to hold and rotate a steel beam, which makes welding difficult due to the beam being capable of moving while working on it.

Accordingly, there is a need for a beam rotator that allows easy access between arms for a steel beam and that can hold the beam stationary while welding or performing other labors. The present invention seeks to solve these and other problems.

SUMMARY OF EXAMPLE EMBODIMENTS

In one embodiment, a beam rotation device comprises a first base plate and a second base plate coupled to a base support frame, which may comprise a first support panel and a second support panel. Coupled to the first support panel and the second support panel is a first vertical jaw arm. On an opposite side, a second vertical jaw arm may be coupled to the first and second support panels. The second vertical jaw arm may be pivotally coupled to the base support and the second base plate. Accordingly, the second vertical jaw arm may pivot outward away from the first vertical jaw arm so as to increase the width of a throat area (i.e., space between the first and second vertical jaw arm) to ease entrance of a steel beam. A housing comprises a linear actuator coupled to a support arm bracket. Extending from the support arm bracket is a support arm. The support arm is moveable up and down on a y-axis via the linear actuator to hold a steel beam. The beam may also be cradled on a chain that extends between the first vertical jaw arm and the second vertical jaw arm.

In one embodiment, a beam rotation system comprises two or more beam rotation devices coupled to each other.

In one embodiment, a remote control communicates with, and sends signals to, a beam rotation device and/or a beam rotation system.

DETAILED DESCRIPTION OF EXAMPLE EMBODIMENTS

Figure 1:
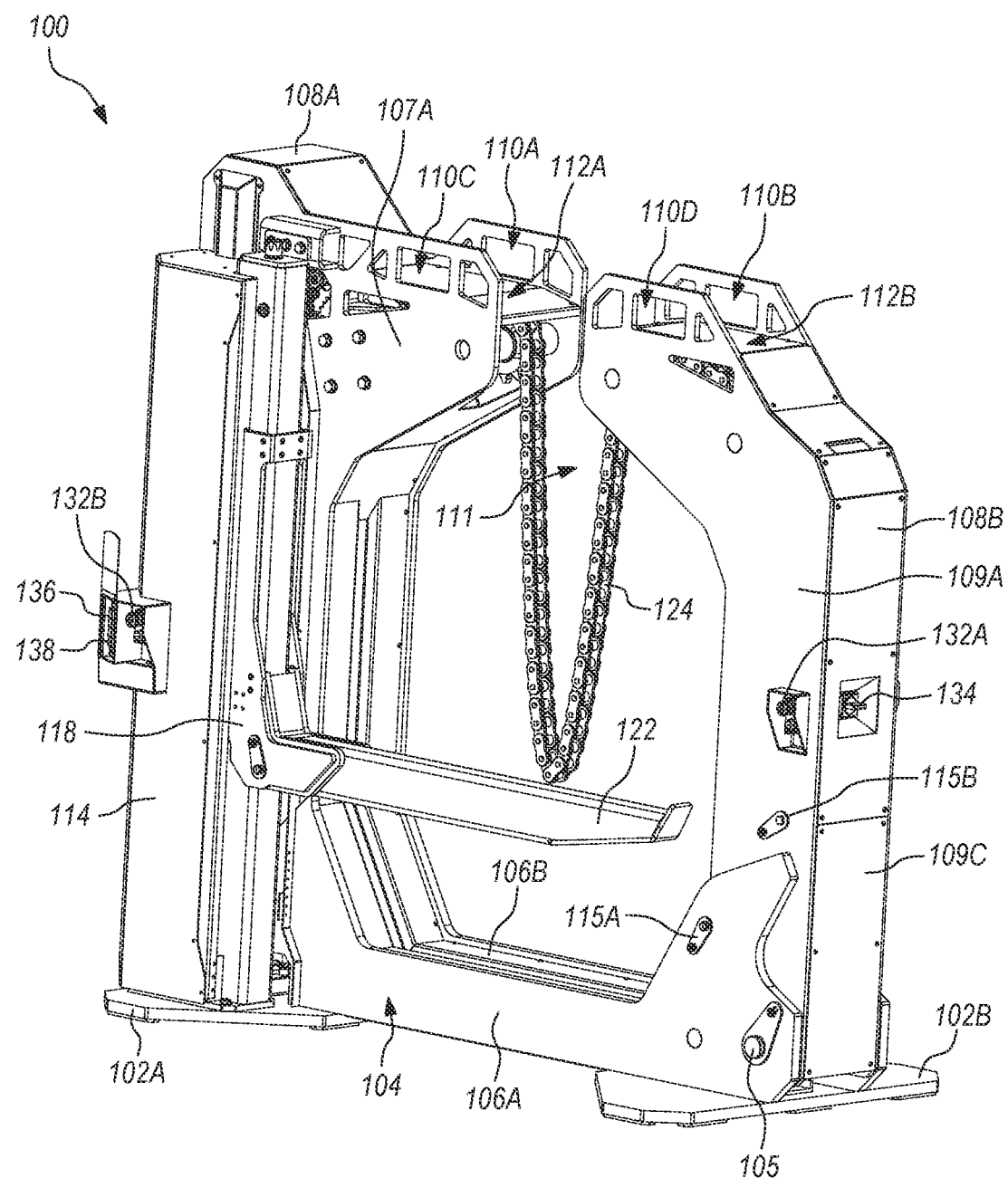
FIG. 1 illustrates a front, right side perspective view of a beam rotation device.
Figure 2:
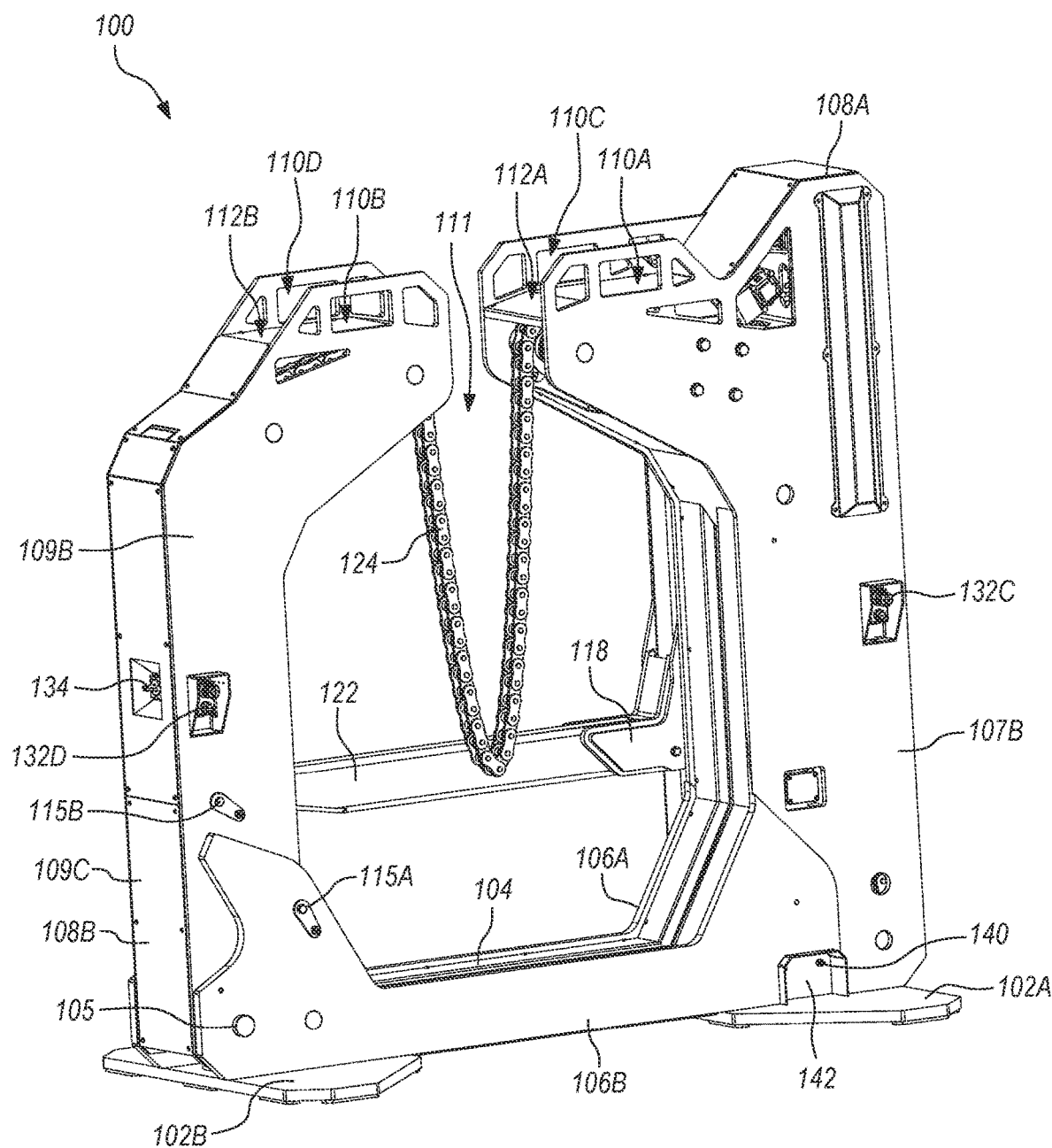
FIG. 2 illustrates a rear, right side perspective view of a beam rotation device.
Figure 3:
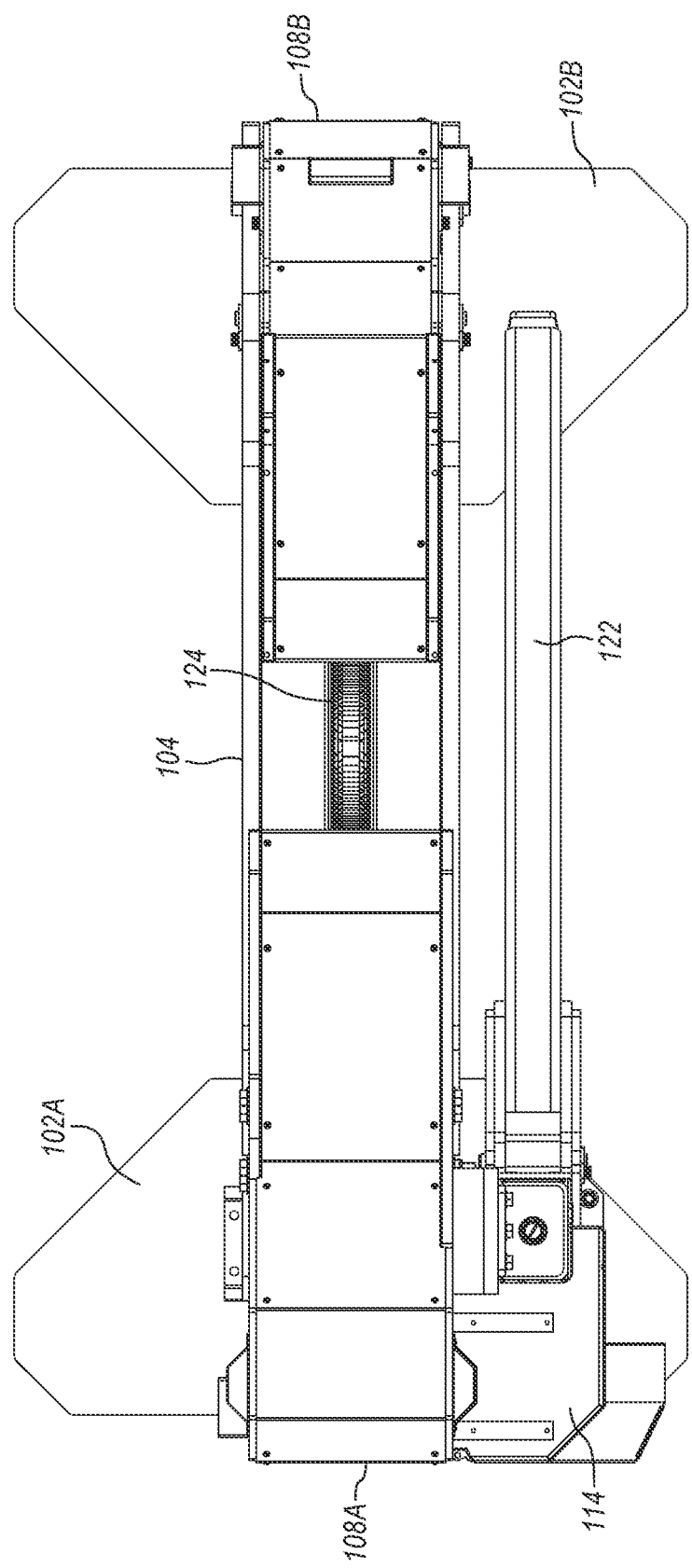
FIG. 3 illustrates a top elevation view of a beam rotation device.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously described, there is a need for a beam rotator that allows easy access between arms for a steel beam and that can hold the beam stationary while welding or performing other labors. The present invention seeks to solve these and other problems.

The beam rotation device described herein comprises a base support with a first vertical jaw arm, a second vertical jaw arm, and a support arm. The second vertical jaw arm may be pivotally coupled to the device so as to go from a first, closed position to a second, opened position to receive a steel beam (e.g., I-beam). Once the steel beam is placed within the device, the support arm may hold the beam stationary to allow a worker to weld or perform other tasks. It will be appreciated that multiple beam rotation devices may be coupled together and work in tandem to receive and rotate a beam. The beam rotation device creates a safer working environment than the rotators found in the art by having a pivotable second vertical jaw arm that may open to receive a beam and a support arm to hold the beam during fabrication.

In one embodiment, as shown in FIGS. 1-7, a beam rotation device 100 comprises a first base plate 102A and a second base plate 102B coupled to a base support frame 104, which may comprise a first support panel 106A and a second support panel 106B. The first support panel 106A and second support panel 106B are coupled to a first vertical jaw arm 108A. It will be appreciated that the first vertical jaw arm 108A may comprise one or more panels 107A, 107B forming the exterior walls of the vertical jaw arm 108A and enclosing its contents, as will be discussed later herein.

Figure 4:
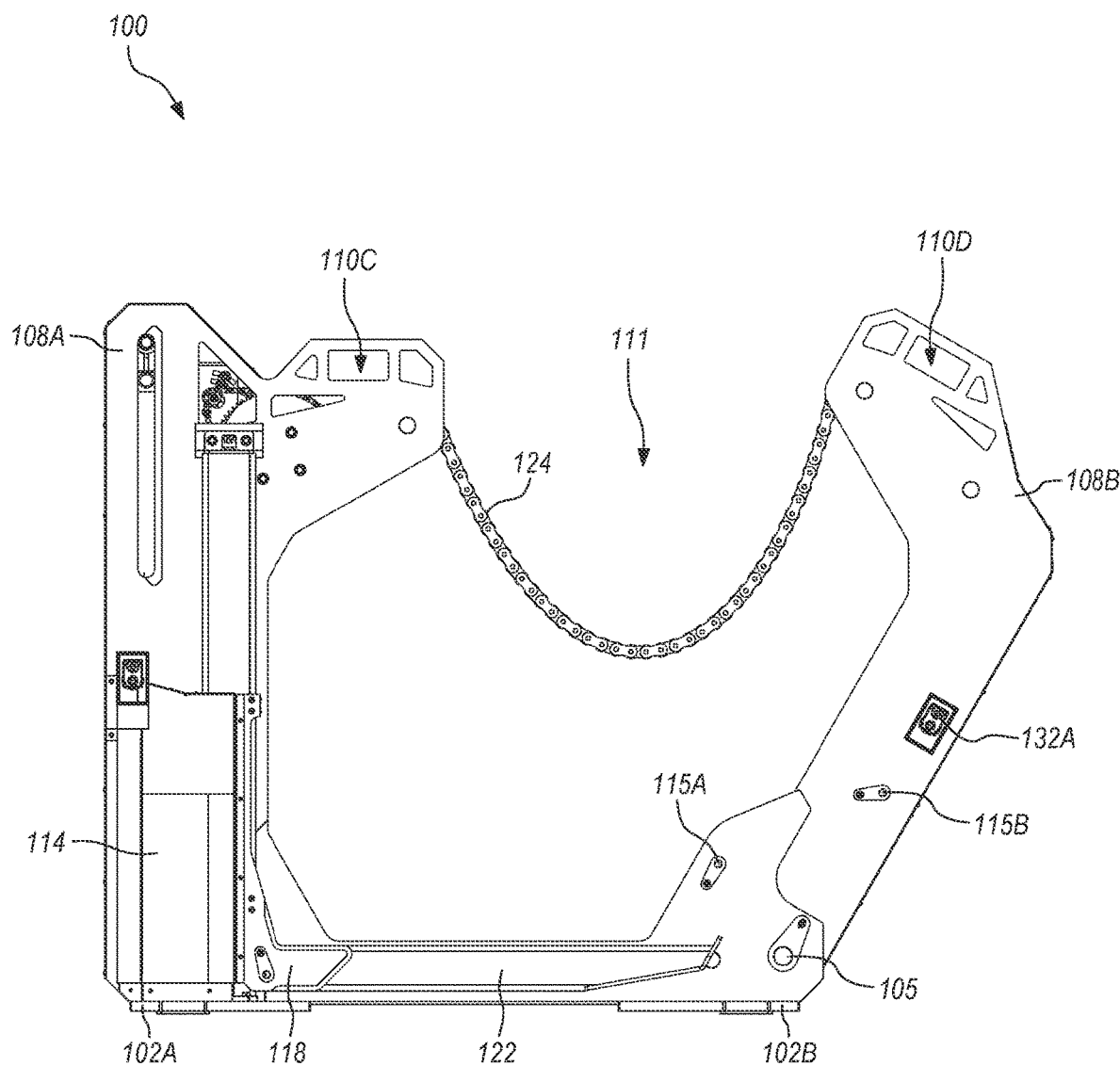
FIG. 4 illustrates a front elevation view of a beam rotation device with a second vertical jaw arm in an extended position.

A second vertical jaw arm 108B is coupled to the first and second support panels 106A, 106B, at an opposite end from the first vertical jaw arm 108A, and may be coupled to the second base plate 102B. The second vertical jaw arm 108B may comprise a plurality of panels 109A-C forming the exterior walls and enclosing its contents. In some embodiments, the second vertical jaw arm 108B may be pivotally coupled to the base support frame 104 and the second base plate 102B, such as by using a hinge pin 105. For example, the hinge pin 105 may pass through the first support panel 106A, through the first panel 109A, through the second panel 109B, and through the second support panel 106B. This allows the second vertical jaw arm 108B to pivot on the hinge pin 105, creating a fulcrum, as shown in FIG. 4 where the second vertical jaw arm 108 is pivoted outwardly, creating a wider throat 111 for receiving or removing a beam.

Figure 5A:
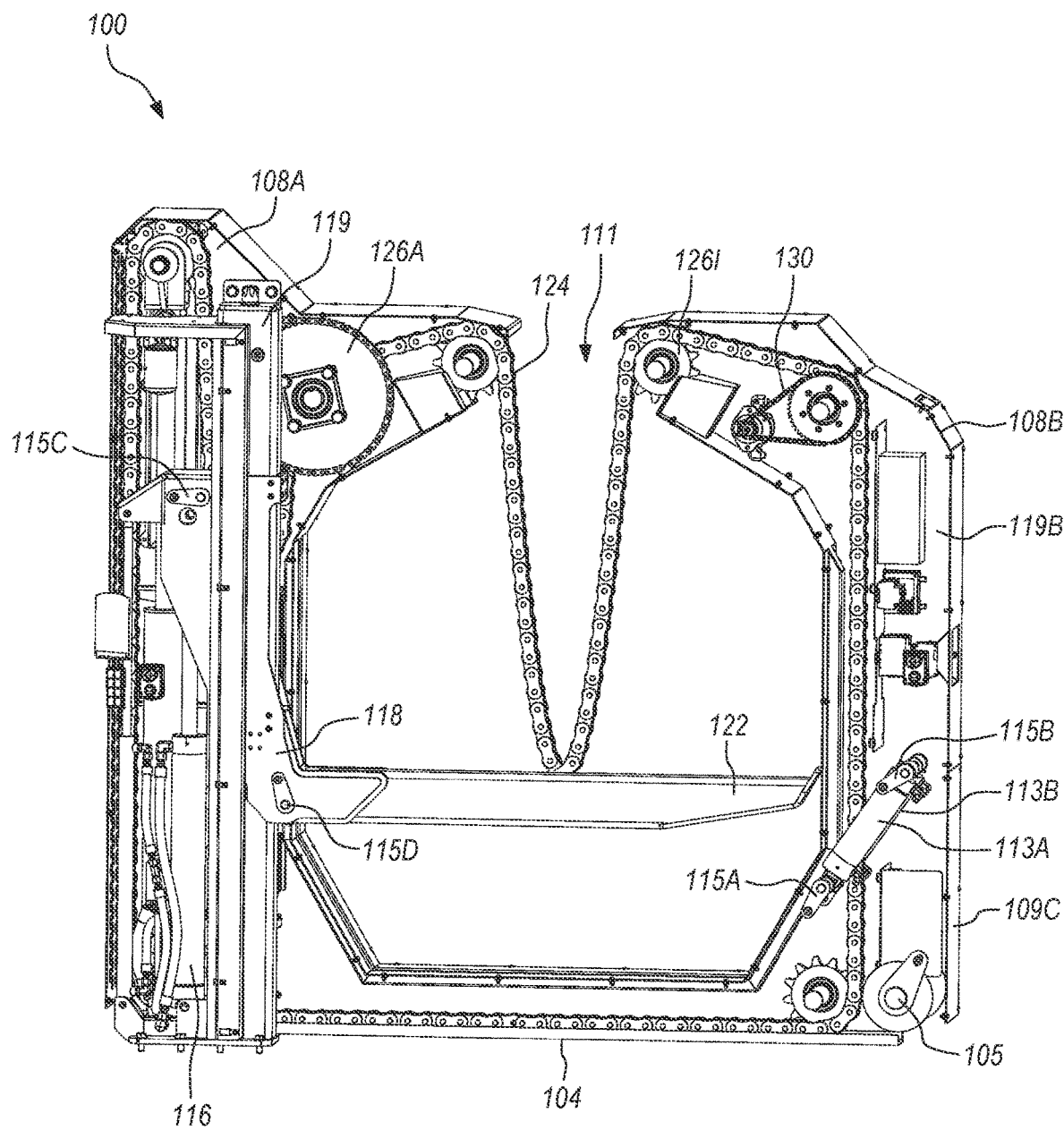
FIG. 5A illustrates a front elevation view of a beam rotation device with front panels removed therefrom.
Figure 5B:
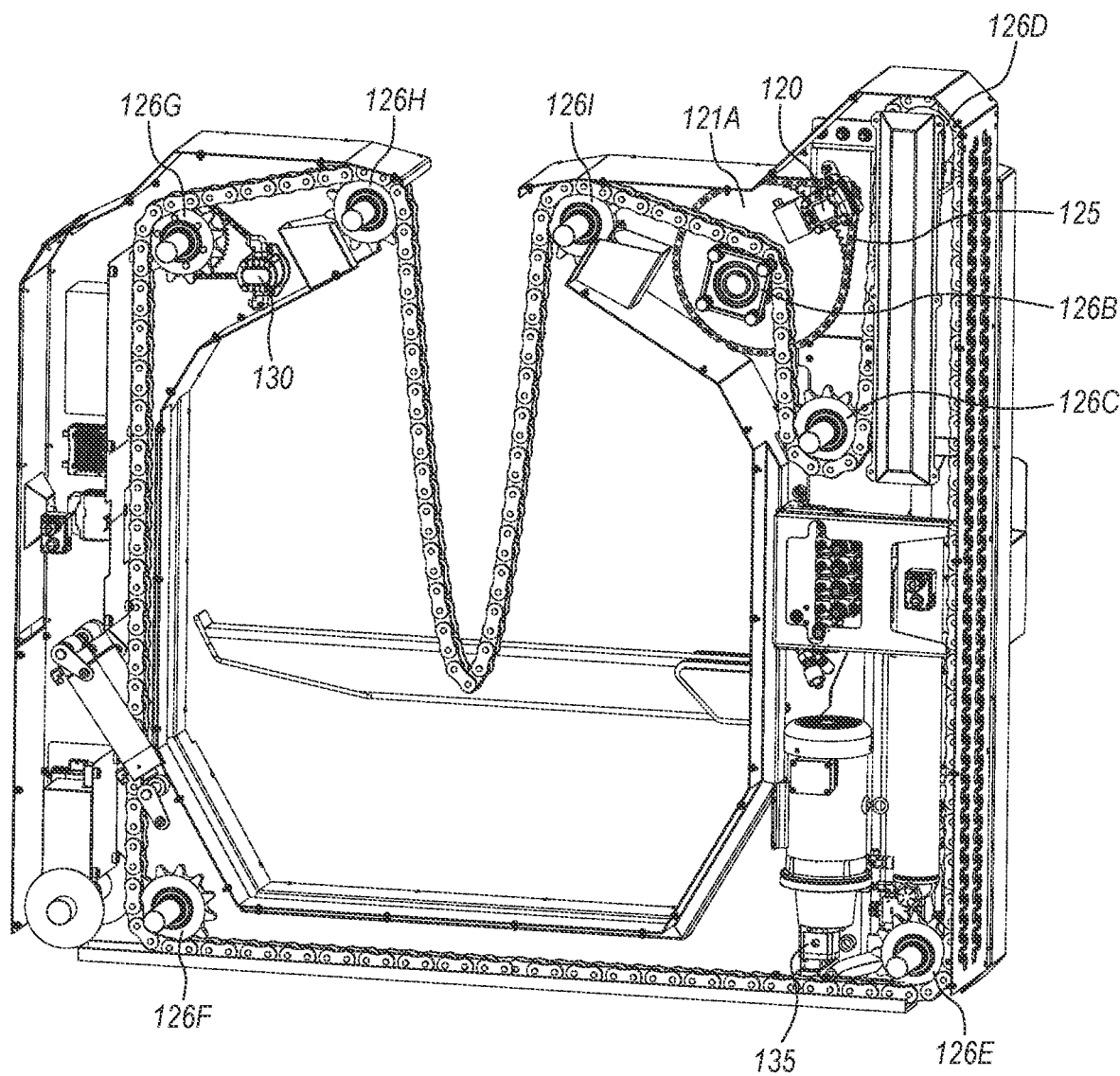
FIG. 5B illustrates a rear perspective view of a beam rotation device with rear panels removed therefrom.
Figure 5C:
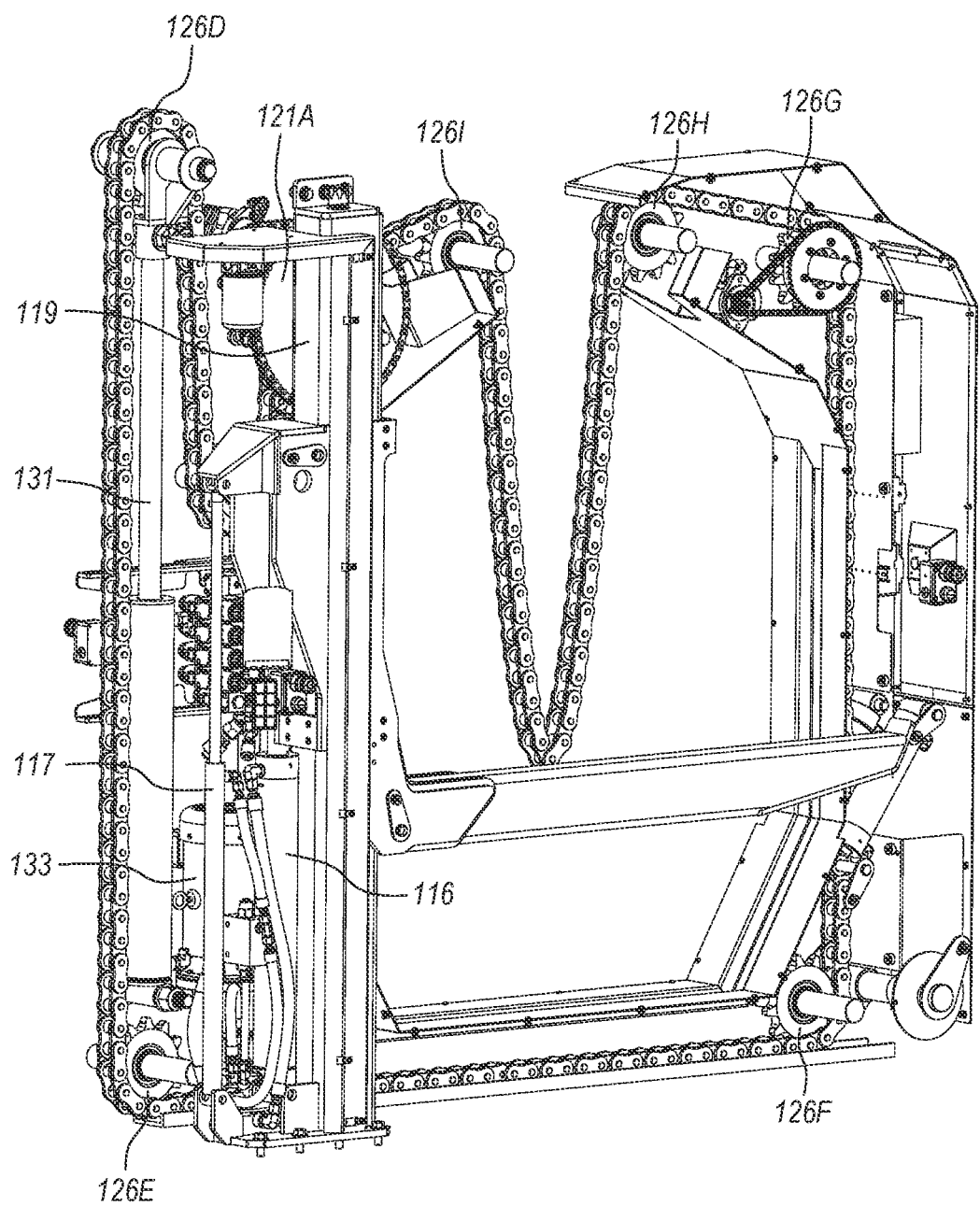
FIG. 5C illustrates a detailed, side view of the interior components of a housing and first vertical jaw arm.

Referring to FIG. 5, the pivoting of the second vertical jaw arm 108B may be controlled using one or more linear actuators 113A-B (e.g., piston and cylinder). The linear actuators 113A-B may be of any known type in the art, such as hydraulic, electric, screw driven, etc. The linear actuators 113A-B may be coupled, at a first end, to the base support frame 104 using a locking pin 115A, with the opposite end coupled to the second vertical jaw arm 108B, such as by using locking pin 115B through the panels 109A-B. For example, to pivot the second vertical jaw arm 108B outwardly, a user would extend the linear actuators 113A-B, which causes the second vertical jaw arm 108B to pivot on the hinge pin 105, thereby widening the throat 111 (i.e., the space between the first and second vertical jaw arm 108A, 108B). Once a beam is placed in the throat 111 (on chain 124), the linear actuator 113A-B is retracted, thereby retracting the second vertical jaw arm 108B and closing the throat 111. Accordingly, by the second vertical jaw arm 108B pivoting outwardly and creating a wider throat 111, the beam rotation device 100 solves the problem of the industry by allowing easier insertion and removal of beams.

Further, a housing 114 may extend vertically and be coupled to the first base plate 102A adjacent the first vertical jaw arm 108A. The housing 114 may comprise a linear actuator 116 (which may be hydraulic, as illustrated, but may also be electric or other known actuator) coupled to a support arm bracket 118, such as by locking pin 115C. The support arm bracket 118 is coupled to a support arm 122, such as by locking pin 115D. The support arm 122 extends horizontally from the first vertical jaw arm 108A towards the second vertical jaw arm 108B. The support arm 122 is moveable up and down on a y-axis via the linear actuator 116. In other words, the support arm bracket 118 is slidably coupled to a jack stand 119. Accordingly, when welding or work needs to be performed on a beam, a user may raise the support arm 122 via the linear actuator 116, support arm bracket 118, and jack stand 119, until the support arm 122 contacts and supports the beam that is resting on the chain 124. With the beam supported by the support arm 122, the beam is less likely to move, allowing a worker to complete work faster and safer. This is a significant improvement over the prior art that relies on chains alone. Relying on chains alone allows the beam to sway; in contrast, the support arm 122 disclosed herein prevents swaying. A second linear actuator 117 (FIG. 5C) may provide stabilization and additional support when raising the support arm 122 via the support arm bracket 118 and the jack stand 119.

When rotation of the beam is necessary, the support arm 122 may be lowered, allowing the beam to be cradled on chain 124. The chain 124 may then be actuated, which rotates the beam as a result. More particularly, the chain 124 may be continuous and run through the beam rotation device 100. A motor 120 rotates a first sprocket 126A using a motor chain 125, which drives a second sprocket 126B engaged with the chain 124. Chain 124 then proceeds around a third sprocket 126C and around the subsequent sprockets 126D-I until returning to the second sprocket 126B. Accordingly, when the motor 120 is actuated, the chain 124 travels throughout the beam rotation device 100. As a result, a beam resting on the chain 124 in the throat 111 is rotated by the chain 124 when it is actuated. To ensure proper tension on the chain 124, the beam rotation device 100 may comprise a tension motor 130. Sprocket 126D may be coupled to a linear actuator 131. This allows a user the ability to easily remove and replace the chain 124 when needed. A hydraulic motor 133 coupled to a hydraulic pump 135 may be used when using hydraulics to drive the various linear actuators (e.g., 116, 117, 131, 113A, 113B, etc.).

Figures 6, 7:
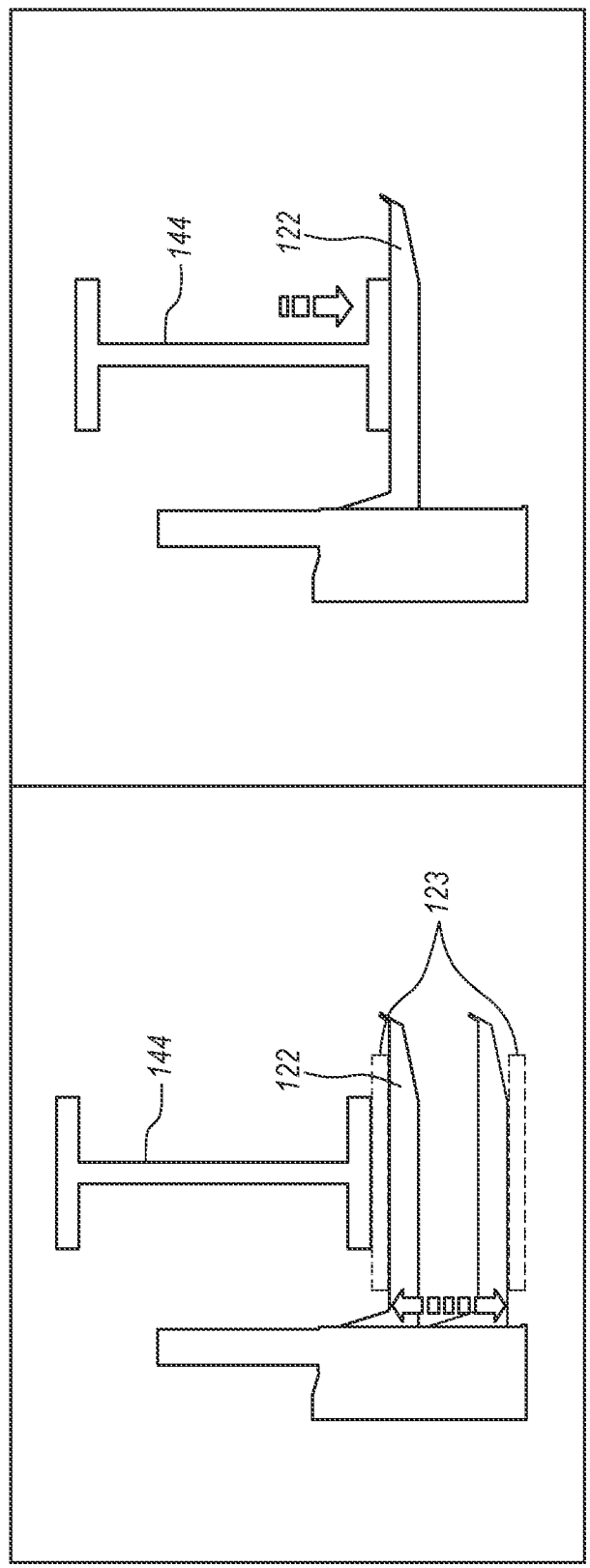
FIG. 6 illustrates a front elevation view of a support arm with a steel beam proximal thereto.
FIG. 7 illustrates a front elevation view of a support arm with a steel beam resting thereon.

In some embodiments, the support arm 122 may be flush or level with the base support frame 104 when in its lowest position, depending upon the configuration of the support arm bracket 118. In addition, as shown in FIGS. 6-7, the beam rotation device 100 may comprise sensors that sense when a beam is near the support arm 122 (e.g., infrared sensor) and on the support arm 122 (e.g., resistance sensor). For example, an infrared sensor may be secured to the support arm 122 to detect when the beam is within a predetermined distance 123 (e.g., two inches) of the support arm 122 while raising. Once the beam is detected, the speed of the support arm 122 may be reduced. A second infrared sensor may be secured to the bottom of the support arm 122 to detect objects in its path or the ground. Further, the support arm 122 may stop when the sensors sense a sudden increase in weight, such as by using sensors that detect the resistance/pressure of the hydraulics, thereby detecting an increase in weight, indicating contact with the beam. By using sensors, the beam rotation device 100 enhances workplace safety and efficiency in steel fabrication shops where steel beams are being fabricated.

Multiple emergency stop buttons 132A-D may be located on the housing 114, first vertical jaw arm 108A, and/or second vertical jaw arm 108B. In one embodiment, the beam rotation device 100 may comprise four emergency stops, with one near each corner of the device 100. If any one of the emergency stop buttons 132A-D are depressed, the entire beam rotation device 100 will stop immediately. In addition, if there is more than one beam rotation device 100, depressing a single emergency stop button 132A-D will cease function of all beam rotation devices. This may be accomplished using wired or wireless communication protocols, such as Bluetooth® or similar. In some embodiments, the emergency stop buttons 132A-D have indicator lights. For example, in one embodiment, if the light color is green, the emergency stop buttons 132A-D have not been depressed. If the light is red, the target emergency stop button has been depressed. If the lights are off, then the target emergency stop button is not active, but one or more emergency stops have been depressed. In some embodiments, when one of the emergency stop buttons 132A-D is depressed or connection is lost between beam rotation devices, an audible alarm (e.g., a chirping sound) will be heard, for example, once every two seconds.

The beam rotation device 100 may further comprise a power switch 134 that turns power on and off to the device 100 and acts as a lockout point. In some embodiments, the power switch 134 is located on the second vertical jaw arm 108B. However, it will be appreciated that the power switch 134 may be located anywhere on the beam rotation device 100, such as the first vertical jaw arm 108A or hydraulic 114. A keypad 136 may be positioned on the first vertical jaw arm 108A or at any other location on the device 100. The keypad 136 may control the beam rotation device 100. The keypad 136 may comprise a plurality of buttons 138, such as beam rotation buttons that control the movement direction of the chain 124, chain in and out buttons that increase or decrease slack of the chain 124, up and down buttons for raising and lowering the support arm 122, and open and close buttons for extending or retracting the second vertical jaw arm 108B.

In addition, the beam rotation device 100 may comprise a power cord connection 140 that couples to a power supply and a communication link connection 142 that allows one or more beam rotation devices to be communicatively connected to each other via a communication cable. For instance, multiple beam rotation devices 100 may have synchronized movements with both the second vertical jaw arms 108B and chain rotation so as to allow a steel beam 144 to rotate evenly from one end to the other. While communication cables are discussed, beam rotation devices 100 may communicate wirelessly via, for example, Bluetooth, Wi-Fi, a radio bridge, or other wireless communication technology.

At times, the beam rotation device 100 may need to be moved. Accordingly, a user may transport the beam rotation device 100 via lift pockets 110A-D on a first upper surface 112A of the first vertical jaw arm 108A and on a second upper surface 112B of the second vertical jaw arm 108B. In particular, the lift pockets 110A-D may receive the arms of a forklift. While lift pockets 110A-D are shown, it could be envisioned that chains, cables, or other types of lifting components could be used to transport the beam rotation device 100.

Figure 8:
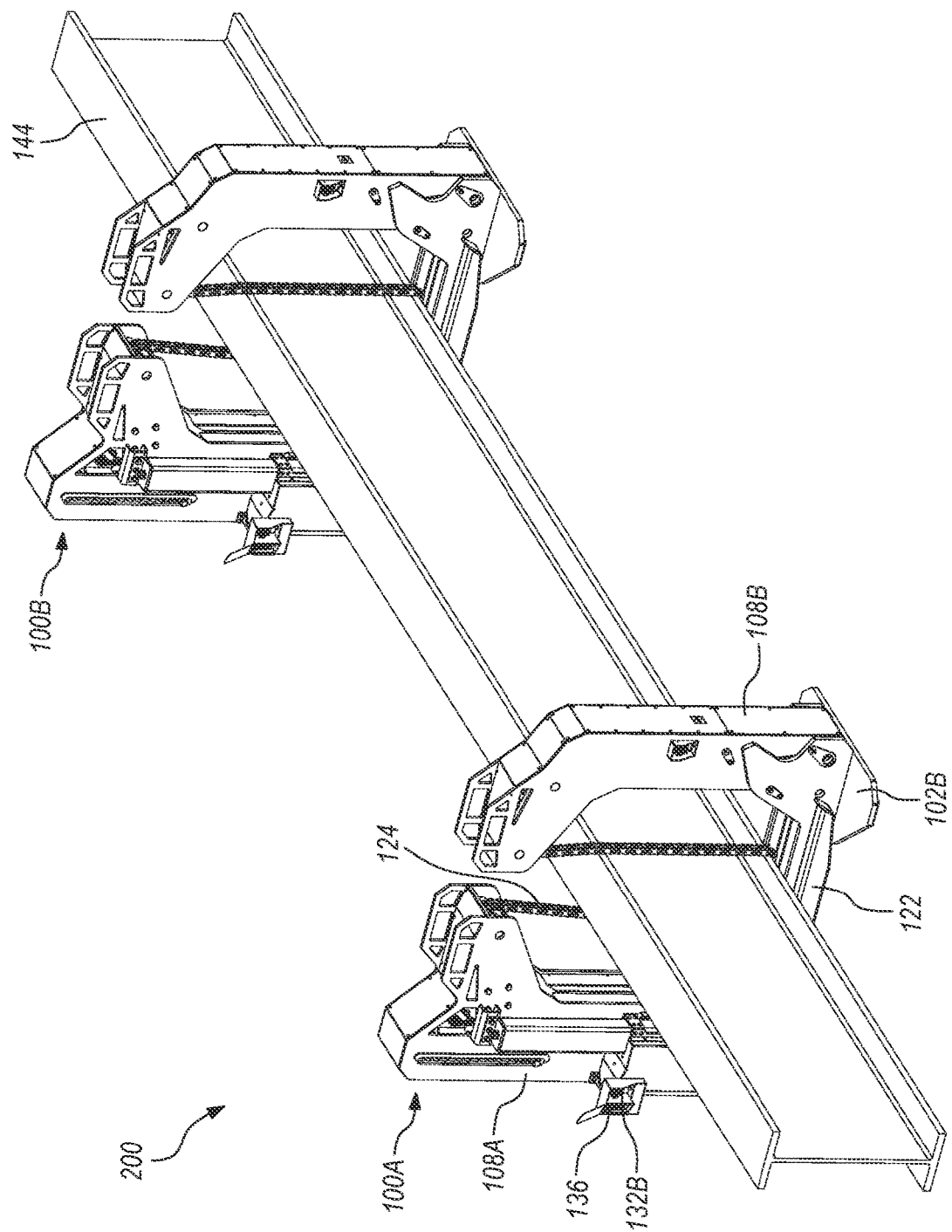
FIG. 8 illustrates a front, top perspective view of a beam rotation system with a steel beam placed therein.

Referring to FIG. 8, multiple beam rotation devices 100A, 100B may electronically connect to each other and work in sync with each other to rotate a single beam 144. Accordingly, a beam rotation system 200 comprises a first beam rotation device 100A and a second beam rotation device 100B receiving a single beam 144. While two beam rotation devices 100A-B are shown, it will be appreciated that more than two may be used to accommodate longer beams. In some embodiments, after the beam rotation devices 100A-B are connected to the power supply, they may begin by initiating and updating their memory with any current connections to other beam rotation devices, both wired and wireless. Once connected, each beam rotation device 100A-B may constantly communicate its status with each other. For example, in one embodiment, the beam rotation devices 100A-B may communicate with each other 20 times a second, although this timing is not required and more or less communication may work.

To remove a beam rotation device 100A-B from the beam rotation system 200, a user may, if a wired connection, disconnect the communication cable from the device being removed and re-initialize the remaining beam rotation devices as a new set. If a wireless connection, may use a user interface to navigate to wireless connections and click to disconnect. When a beam rotation device 100A-B is disconnected from the beam rotation system 200, the remaining beam rotation devices are capable of immediately activating an emergency stop mode to prevent injury to a user. In some embodiments, reconnecting the beam rotation device 100A-B to the beam rotation system 200 deactivates the emergency stop mode.

Figure 9:
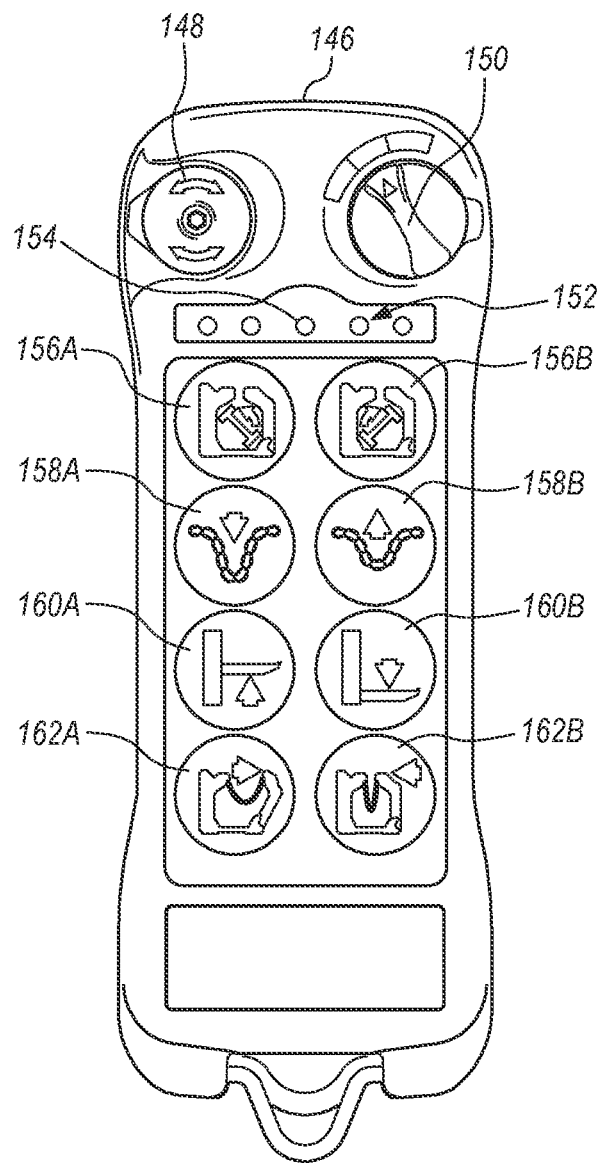
FIG. 9 illustrates a remote control for a beam rotation device and/or a beam rotation system.

FIG. 9 illustrates a remote control 146 that may be used to control a single beam rotation device 100 or to control the beam rotation system 200. It will be appreciated, as discussed above, that each beam rotation device 100 may be controlled by their own keypad 136. The remote control 146 may communicate with the beam rotation device 100 or system 200 wirelessly through Bluetooth®, Wi-Fi, infrared, etc. In addition, the remote control 146 may comprise a stop button 148 that may function the same as the emergency stop buttons 132A-D on each of the beam rotation devices 100. In some embodiments, the stop button 148 functions when the remote 146 is powered on and connected to the device 100 or system 200. The remote control 146 may comprise a switch 150 that controls the whether the beam rotation device 100 or system 200 is on or off and the speed. The remote control 146 may have four speed settings which are percentages of the maximum speed: 25%, 50%, 75%, and 100%. In some embodiments, these speed settings control the maximum speed value of the buttons. For example, if the speed setting is set to 25%, the motion of the device 100 or system 200 is limited to 25% speed across all moving systems (e.g., speed of chain 124, speed of support arm 122, etc.). The remote control 146 may comprise a set of status indicator lights 152 that notify a user of power and speed. The set of indicator lights 152 may comprise a status light 154. In one embodiment, when the switch 150 is turned on, the status light 154 may light up as a green light for two seconds and then slowly flash.

A first rotate button 156A may rotate a beam counter-clockwise via the chain 124 while a second rotate button 156B may rotate the beam clockwise via the chain 124. In addition, a first chain slack button 158A may increase the amount of slack in the chain 124. A second chain slack button 158B may decrease slack in the chain 124. Other buttons on the remote control 146 may include a first support arm button 160A that raises the support arm 122 and a second support arm button 160B to lower the support arm 122. A first jaw button 162A may open the second vertical jaw arm 108B and a second jaw button 162B may close the second vertical jaw arm 108B. It will be appreciated that the above-described buttons are not limited to a certain order or orientation. Further, the remote control 146, in some embodiments, may have as few as one button or may have a plurality of buttons. In some embodiments, the remote control 146 may be in the form of a mobile application, which a user may operate from a smart device, such as a smartphone or tablet.

In some embodiments, on both keypad 136 and remote controls 146, buttons must be held depressed for the duration of motion. In some embodiments, if there are conflicting commands from multiple sources, the first command locks out all conflicting commands until the button sending the first command is released. In some embodiments, the buttons on the remote control 146 are proportional, meaning the harder/farther the button is pressed, the faster the speed of motion. Further, in a beam rotation system 200, a single remote control 146 controls each beam rotation device 100A-B simultaneously.

Figure 10:
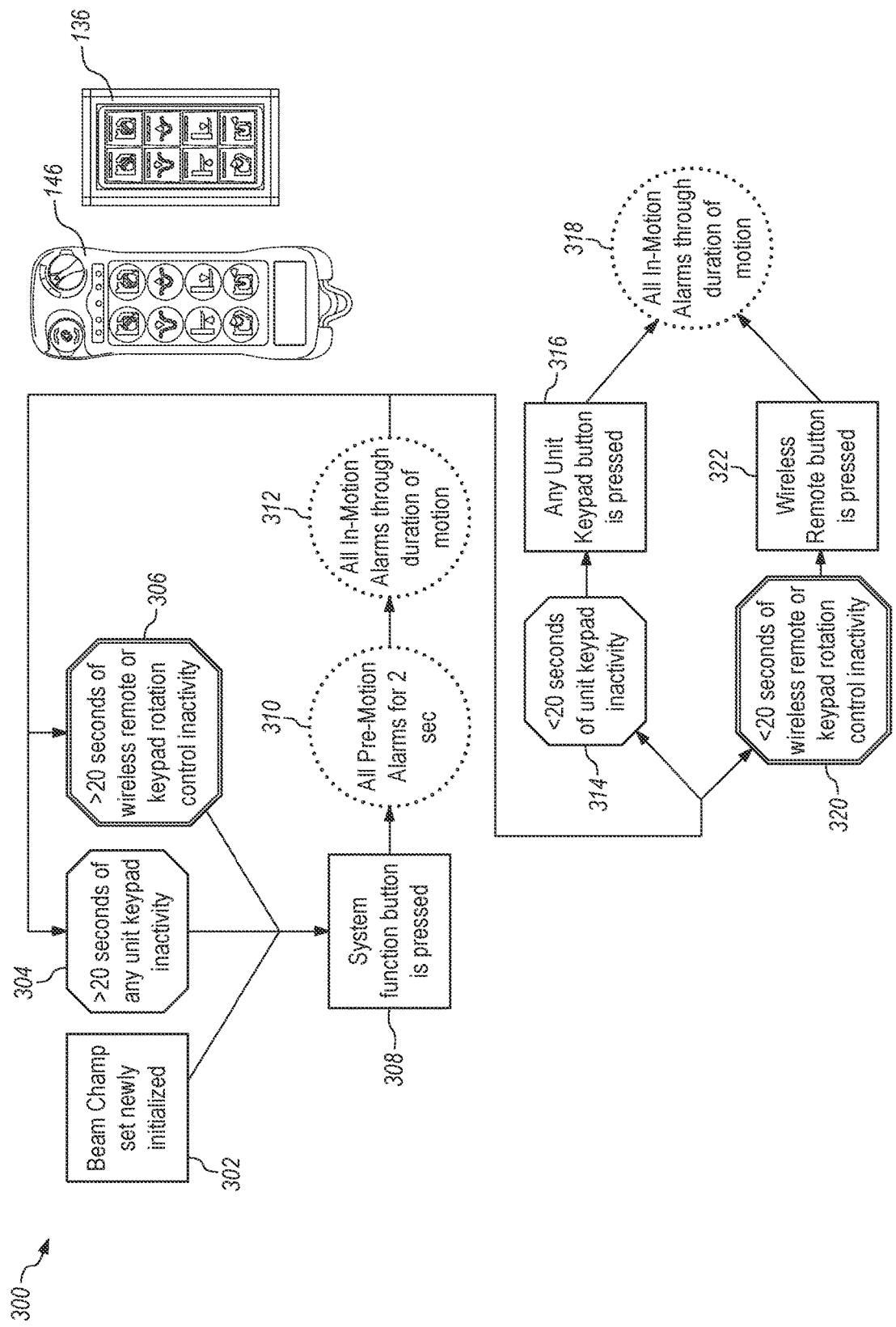
FIG. 10 illustrates a diagram of an alarm system of a beam rotation device.

Referring to FIG. 10, a first alarm system 300 may assist and add protection for a user while the beam rotation devices 100A-B are in motion. At step 302, the beam rotation system 200 ("Beam Champ") is initialized. After greater than 20 seconds of any keypad inactivity at step 304 and greater than 20 seconds of inactivity of wireless remote 146 or keypad 136 control, the system is ready for use. In step 308 initiating a function may be actuated on either the remote 146 or keypad 136. At step 310, all pre-motion alarms sound for two seconds. It will be appreciated that step 310 may have alarms, in some embodiments, that are shorter or longer. At step 312, all in-motion alarms sound through the duration of motion (e.g., an alarm sounds when the beam is rotated, vertical jaw arm opened, etc.). After step 312, if more than 20 seconds have elapsed since a command was received by the system, the system may return to steps 304 or 306. If less than 20 seconds have elapsed since a command was received when a new command is received, then the system proceeds to step 314 or 320. If a keypad button is pressed in 316 or the remote is used in 322, only the in-motion alarms sound in 318.

Figure 11:
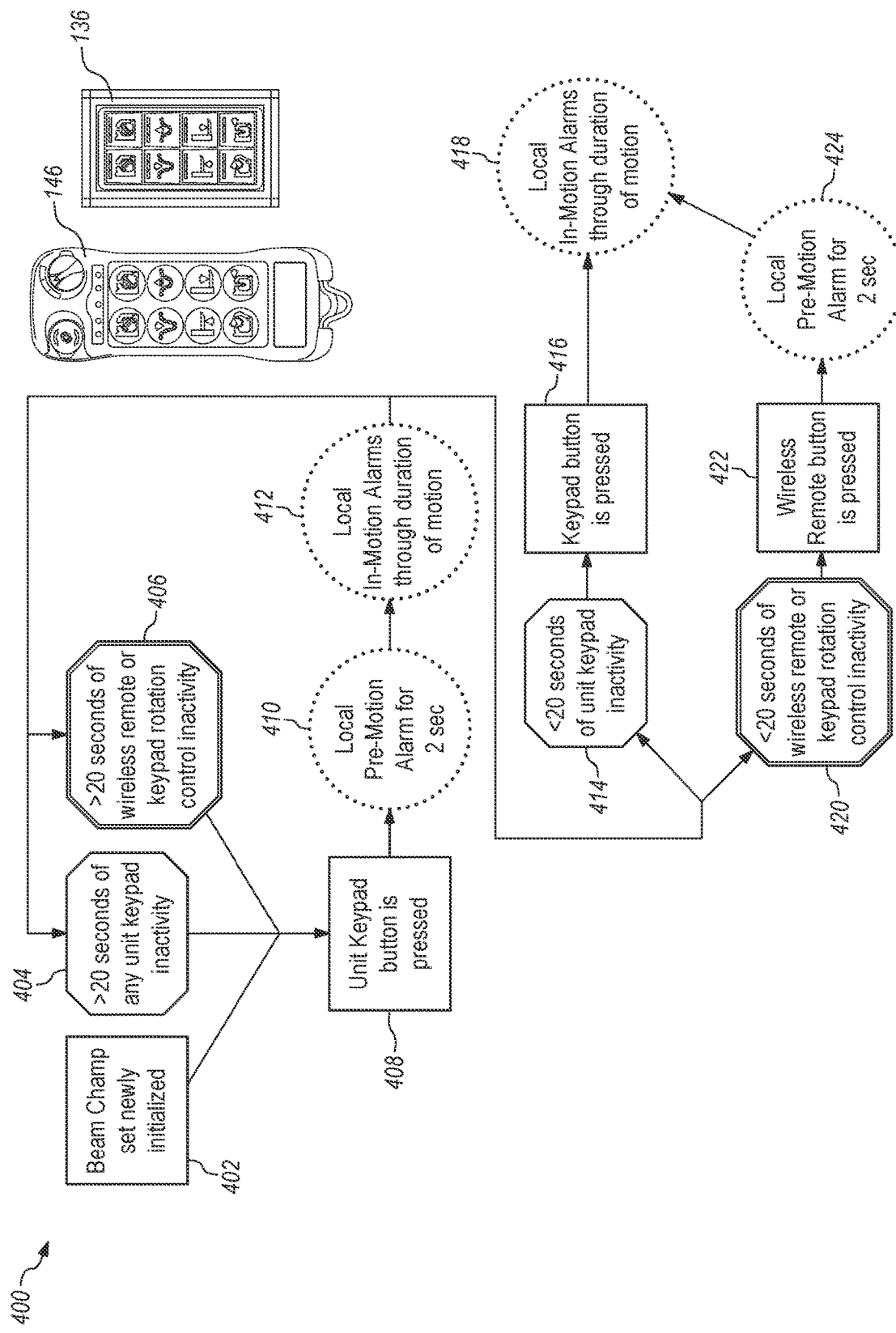
FIG. 11 illustrates a diagram of an alarm system of a beam rotation device.

In some embodiments, as shown in FIG. 11, the pre-motion alarms may vary depending upon the source of the command (e.g., keypad 136 vs. remote 146). For example, in the safety system 400 and at step 402, the beam rotation system 200 ("Beam Champ") is initialized. After greater than 20 seconds of any keypad inactivity at step 404 and greater than 20 seconds of inactivity of wireless remote 146 or keypad 136, the system is ready for use. In step 408 initiating a function may be actuated on either the remote 146 or keypad 136. At step 410, all pre-motion alarms sound for two seconds. At step 412, all in-motion alarms sound through the duration of motion (e.g., an alarm sounds when the beam is rotated, vertical jaw arm opened, etc.). After step 412, if more than 20 seconds have elapsed since a command was received by the system, the system may return to steps 404 or 406. If less than 20 seconds have elapsed since a command was received when a new command is received, then the system proceeds to step 414 or 420. If a keypad 136 button is pressed in 416, the in-motion alarm sounds. On the other hand, if the remote 146 is used in 422, a pre-motion alarm sounds at 424 and then the in-motion alarms sound in 418.

Therefore, as appreciated from the foregoing disclosure, the beam rotation device 100 and system 200 solve the problems in the art by having an expandable throat 111 to receive and remove beams, by having a support arm 122 to keep the beams stable while work is performed, and by having a safety system in place while using the system, among others.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A beam rotation device, comprising:
   a base support frame;
   a first vertical jaw arm extending from a first side of the base support frame;
   a second vertical jaw arm pivotally coupled to a second side of the base support frame via one or more linear actuators and a hinge pin;
   a chain passing from the first vertical jaw arm to the second vertical jaw arm, a throat formed between the first vertical jaw arm and the second vertical jaw arm; and
   a support arm moveable on a y-axis, the support arm configured to contact and support a beam placed in the throat
   wherein the chain is configured to pass through the beam rotation device via a plurality of sprockets and wherein at least one sprocket is coupled to a linear actuator, wherein when the linear actuator is in a retracted position, the chain may be removed from the beam rotation device.

2. The beam rotation device of claim 1, wherein the support arm is coupled to a support arm bracket, the support arm bracket slidably coupled to a jack stand, the support arm bracket moveable on the jack stand via one or more linear actuators.

3. The beam rotation device of claim 1, further comprising a motor to actuate at least one sprocket and thereby the chain.

4. The beam rotation device of claim 1, further comprising a plurality of emergency stop buttons.

5. The beam rotation device of claim 1, wherein the first vertical jaw arm and second vertical jaw arm comprise lift pockets for receiving arms of a forklift.

6. The beam rotation device of claim 1, further comprising a motor and pump for actuating the linear actuators.

7. The beam rotation device of claim 1, further comprising a keypad and a remote control.

8. The beam rotation device of claim 1, further comprising an audible alarm during motion of the beam rotation device.

9. A beam rotation device, comprising:
   a base support frame;
   a first vertical jaw arm extending from a first side of the base support frame;
   a second vertical jaw arm pivotally coupled to a second side of the base support frame via a hinge pin;
   at least one linear actuator coupled to the base support frame and the second vertical jaw arm, the linear actuator configured to control the pivot position of the second vertical jaw arm;
   a chain passing from the first vertical jaw arm to the second vertical jaw arm, through the base support frame, and returning to the first vertical jaw arm;
   a throat formed between the first vertical jaw arm and the second vertical jaw arm, the chain suspended in the throat;
   a housing coupled to the first vertical jaw arm, the housing comprising a jack stand;
   a support bracket slidable on the jack stand, a support arm extending horizontally from the support bracket and crossing the throat area from the first vertical jaw arm toward the second vertical jaw arm; and
   a linear actuator coupled to the support bracket, the linear actuator configured to control the height of the support bracket and support arm coupled thereto.

10. The beam rotation device of claim 9, further comprising a motor to actuate the chain in a desired direction.

11. The beam rotation device of claim 9, further comprising a plurality of emergency stop buttons.

12. The beam rotation device of claim 9, wherein the first vertical jaw arm and second vertical jaw arm comprise lift pockets for receiving arms of a forklift.

13. The beam rotation device of claim 9, further comprising a motor and pump for actuating the linear actuators.

14. The beam rotation device of claim 9, further comprising a keypad and a remote control.

15. The beam rotation device of claim 9, further comprising an audible alarm during motion of the beam rotation device.

16. A beam rotation device, comprising:
    a base support frame;
    a first vertical jaw arm extending from a first side of the base support frame;
    a second vertical jaw arm pivotally coupled to a second side of the base support frame via one or more linear actuators and a hinge pin;
    a chain passing from the first vertical jaw arm to the second vertical jaw arm, a throat formed between the first vertical jaw arm and the second vertical jaw arm;
    a support arm moveable on a y-axis, the support arm configured to contact and support a beam placed in the throat; and
    a plurality of emergency stop buttons.

17. A beam rotation device, comprising:
    a base support frame;
    a first vertical jaw arm extending from a first side of the base support frame;
    a second vertical jaw arm pivotally coupled to a second side of the base support frame via one or more linear actuators and a hinge pin;
    a chain passing from the first vertical jaw arm to the second vertical jaw arm, a throat formed between the first vertical jaw arm and the second vertical jaw arm;
    a support arm moveable on a y-axis, the support arm configured to contact and support a beam placed in the throat; and
    wherein the first vertical jaw arm and second vertical jaw arm comprise lift pockets for receiving arms of a forklift.

18. A beam rotation device, comprising:
    a base support frame;
    a first vertical jaw arm extending from a first side of the base support frame;
    a second vertical jaw arm pivotally coupled to a second side of the base support frame via one or more linear actuators and a hinge pin;
    a chain passing from the first vertical jaw arm to the second vertical jaw arm, a throat formed between the first vertical jaw arm and the second vertical jaw arm;
    a support arm moveable on a y-axis, the support arm configured to contact and support a beam placed in the throat; and
    a motor and pump for actuating the one or more linear actuators.

19. A beam rotation device, comprising:
    a base support frame;
    a first vertical jaw arm extending from a first side of the base support frame;

a second vertical jaw arm pivotally coupled to a second side of the base support frame via one or more linear actuators and a hinge pin;

a chain passing from the first vertical jaw arm to the second vertical jaw arm, a throat formed between the first vertical jaw arm and the second vertical jaw arm;

a support arm moveable on a y-axis, the support arm configured to contact and support a beam placed in the throat; and an audible alarm during motion of the beam rotation device.

\* \* \* \* \*